United States Patent [19]

Schultz

[11] E Re. 29,214

[45] Reissued May 10, 1977

[54] PREASSEMBLED ELECTRICAL WIRING APPARATUS AND METHOD OF INSTALLATION THEREOF

[76] Inventor: Robert L. Schultz, 5597 Green Highway, Tecumseh, Mich. 49286

[22] Filed: Feb. 10, 1975

[21] Appl. No.: 548,523

Related U.S. Patent Documents

Reissue of:

[64] Patent No.: 3,792,190
Issued: Feb. 12, 1974
Appl. No.: 307,273
Filed: Nov. 16, 1972

[52] U.S. Cl. ..... 174/72 R; 29/428; 52/741; 53/21 FW; 174/49; 174/72 A; 206/330; 206/390

[51] Int. Cl.[2] ..... H02G 3/02; H02G 1/00; B65D 85/00

[58] Field of Search ..... 174/10, 48, 49, 68 R, 174/70 R, 70 C, 71 R, 72 R, 72 A, 72 C; 52/220, 221, 741, 745; 53/21 FW; 29/428, 433, 625, 628; 206/328, 330, 390; 307/42, 147; 317/122

[56] References Cited

UNITED STATES PATENTS

| | | | |
|---|---|---|---|
| 1,637,046 | 7/1927 | Montsinger | 174/72 R |
| 3,153,119 | 10/1964 | Hart | 174/72 A |

FOREIGN PATENTS OR APPLICATIONS

| | | | |
|---|---|---|---|
| 1,133,055 | 11/1956 | France | 174/72 R |
| 762,800 | 3/1953 | Germany | 174/72 R |
| 152,360 | 11/1955 | Sweden | 174/48 |
| 597,877 | 2/1948 | United Kingdom | 174/49 |
| 851,420 | 10/1960 | United Kingdom | 174/72 R |
| 1,149,001 | 4/1969 | United Kingdom | 174/72 R |

*Primary Examiner*—Laramie E. Askin
*Attorney, Agent, or Firm*—Thomas N. Young

[57] ABSTRACT

A method and apparatus for wiring a building structure including a factory-assembled wiring harness having a trunk cable portion and a plurality of branch cable portions, each branch cable portion having an electrical terminal device, such as a switch or outlet, permanently electrically secured to the end thereof. Installation is facilitated by individually packaging the electrical terminal devices and a portion of the branch cable secured thereto in individual plastic bags, and wrapping the entire harness in an elongate plastic envelope which is then rolled up from one end to the other. In the preferred example, the wiring harness is placed on a grid-like ceiling module and unrolled longitudinally from one end to the other. The envelope is opened and the individual terminal devices are extended outwardly therefrom and tacked in place and left hanging around the outside of the ceiling module. After the ceiling module is disposed on the walls, the electrical terminal device packages are opened to allow the devices to fall to their vertical extension and secured in place. Outer peripheral notches and protective plates are employed to provide raceways or channels for the electrical wiring.

13 Claims, 4 Drawing Figures

PREASSEMBLED ELECTRICAL WIRING APPARATUS AND METHOD OF INSTALLATION THEREOF

Matter enclosed in heavy brackets [ ] appears in the original patent but forms no part of this reissue specification; matter printed in italics indicates the additions made by reissue.

INTRODUCTION

This invention relates to electrical wiring systems for buildings such as homes, apartments, and offices and particularly to such electrical wiring systems as may be preassembled to certain building specifications and later installed in an expeditious fashion.

BACKGROUND OF THE INVENTION

Internal electrical wiring for buildings has long been provided by effectively hand stringing electrical cable throughout the building during the construction thereof and individually connecting various circuit branches to the various electrical devices, such as switches, outlets and lighting units which are typically found in a home, apartment, or office. When carried out according to this customary hand stringing procedure the wiring of even a home of modest proportions is a substantial job requiring many hours of skilled labor.

Very few attempts have been made to modernize or systemmatize the electrical wiring process. One example of an attempt to reduce on-site electrical wiring time in favor of factory preassembly is described in the British Patent Specification 597,877, dated Feb. 5, 1948. In that patent, a wiring unit is provided comprising a central terminal box of sheet metal construction containing terminals for the connection of feeders from a main distribution board. The unit further comprises a plurality of flexible cables which radiate outwardly from the terminal box for connection to electrical devices, such as lamps and outlets. According to the patent, the terminal box is installed above the ceiling in a room or portion of a dwelling house to be wired and the various leads are extended outwardly from the terminal box after having been connected to respective terminal pairs within the box such that the devices on the ends of the leads may be secured within the ceiling such as by drilling holes in the ceiling and securing the devices by means of suitable brackets.

Although the device of the British Specification accomplishes a degree of factory preassembly, the overall solution to economic and expeditiously installed electrical wiring is not provided by the British Specification; in general, the requirement for the complex terminal boxes of the British system add substantial cost and complexity. Moreover, the system of the British Specification lacks flexibility or adaptability to various building designs and construction methods.

BRIEF SUMMARY OF THE INVENTION

In accordance with the present invention, a modular electrical wiring unit is provided which may be substantially completely factory assembled for installation directly into a building during the construction thereof, thereby minimizing the requirement for on-site, highly-skilled labor while at the same time providing a flexible, economical, and safe electrical wiring system for such buildings as homes, apartments, offices, and the like. In general, the system of the present invention comprises a preassembled wiring harness including a trunk cable of the multiple-conductor type known to the trade as ROMEX and a plurality of electrical terminal devices, such as switches, outlets, and lighting fixtures electrically and permanently connected to the trunk cable at various locations which are spaced along the trunk cable in accordance with the peripheral spacings between the terminal device locations in the building structure to which the prewired electrical wiring unit is to be applied.

In accordance with a second aspect of the invention, the prewired, electrical wiring unit complete with the wiring harness and the electrical terminal devices is packaged at the factory in such a fashion as to facilitate identification and installation of the prewired electrical wiring unit at various phases of construction of the structure to be wired. In general, preparation of a unit comprises first packaging the individual electrical terminal devices along with a coiled length of the branch cable connected thereto and, secondly, packaging the entire wiring harness in a nonpermeable envelope which is of substantially the same length as that of the trunk cable and which may be rolled up from one end to the other with the cable and electrical terminal devices contained therein. This package may then be conveniently unrolled at the installation site after having been suitably located with respect to one or more reference marks applied to the building structure.

In a preferred application and embodiment of the invention, an electrical wiring harness for installation in a prebuilt ceiling module is provided and is packaged for expeditious installation in accordance with the previous explanation. More specifically, the prewired electrical wiring unit for modular ceiling installation comprises a trunk cable which is substantially as long as the ceiling unit and which has electrically connected thereto a plurality of branch cables each of which has on the end thereof an electrical terminal device, such as a switch or outlet. The length of the branch cables is selected to be at least equal to the sum of the horizontal run from the central location of the trunk cable to the periphery of the ceiling unit together with the vertical run from the outside edge of the ceiling unit to the standard height above the floor for the particular electrical terminal device. The electrical terminal devices are individually packaged along with a substantial portion of the vertical run of the branch cable. It has been found that small, transparent polyethylene bags are particularly advantageous for this purpose as they provide a weather-tight, dust-proof package and also permit visual inspection of the device before removal of the package. At the factory the electrical terminal devices complete with the coiled branch cables are assembled in a substantially linear array and placed within a long envelope of transparent polyethylene material, for example, which is folded over on itself and sealed along the double edge thereof. This envelope is then rolled up from one end to the other to provide a portable and convenient package which may be easily identified and placed in the proper position on the ceiling module for later installation.

In accordance with another aspect of the invention, an installation procedure is provided whereby the prewired electrical wiring units or harnesses may be simply and readily installed in a building during the construction phase thereof without the necessity for the conventional hole-drilling process which is so well known in the prior art in order to provide installation raceways for the electrical cable between the studs, plates, rafters, joists, and other elements of building construction. In general, the installation of the ceiling unit, previously described, involves the formation of grooves in the modular ceiling units and the disposition of the branch cables along the outside periphery of the ceiling unit and the walls associated therewith so that all the installation of the various electrical terminal devices may be carried out from behind prebuilt walls. In addition, cable protector means are provided for guarding against the inadvertent damage of an electrical cable from, for example, driving a nail through a cable during some later construction or installation process.

The invention may be best understood from a reading of the following specification which describes specific embodiments and processes utilizing the invention.

DETAILED DESCRIPTION OF THE ILLUSTRATIVE EMBODIMENT

Figure 1:
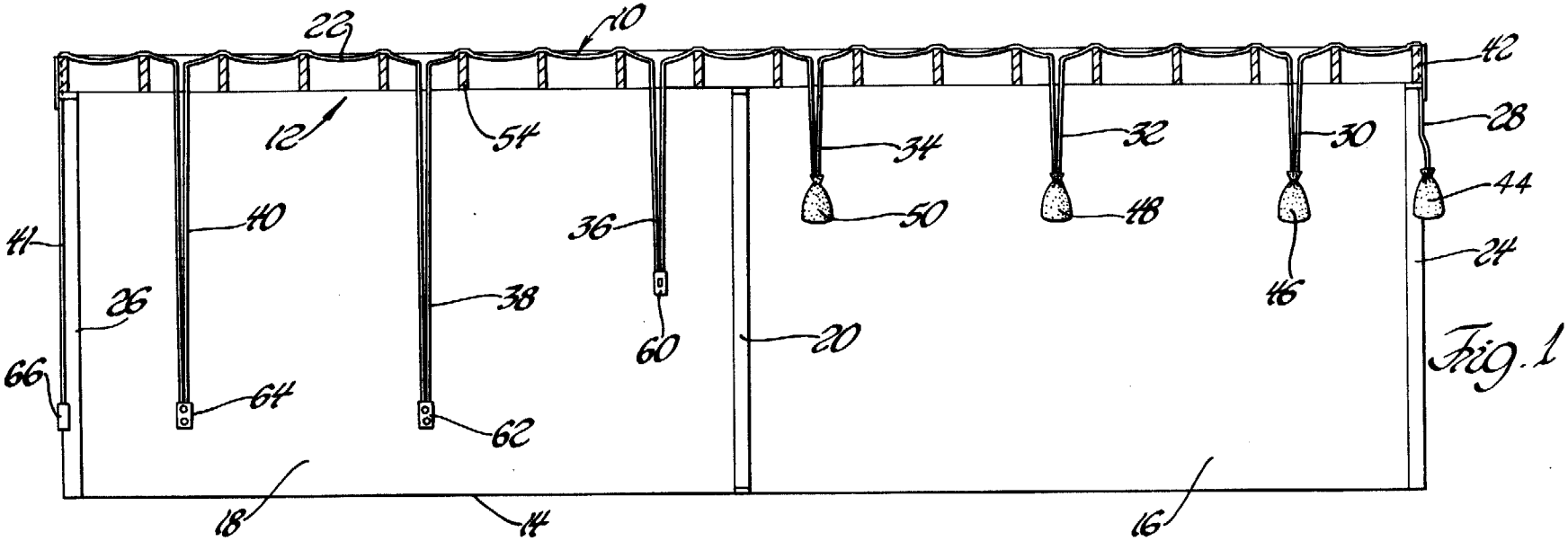
FIG. 1 is a side view of a building structure with structural parts broken away illustrating the application of a prewired wiring apparatus and installation thereof in accordance with the present invention.

Referring now to FIG. 1, an illustrative embodiment of the invention is shown in the application of a preassembled wiring harness 10 to the ceiling module 12 of a two-room structure 14. This application of the invention contemplates the separate construction of the ceiling module 12 and the walls and floor of the building structure 14 and the subsequent attachment of the ceiling module to the erect walls. In accordance with the illustrative embodiment of the invention, the wiring harness 10 and the various portions thereof to be hereinafter described are prepackaged in two phases, the first packaging phase to be opened or undone upon installation of the wiring harness 10 in the ceiling module 12 and the second packaging phase to be opened or undone after application of the ceiling module 12 to the structure 14.

Structure 14 is shown to comprise rooms 16 and 18 which are separated by means of a conventional wall 20 defined by horizontal plates and a series of spaced studs as is well known to those familiar with the construction industry. The end walls, front walls, and back walls are also constructed in the ordinary fashion using two-by-four studs vertically arranged and using such conventional interior facing materials as plaster board, paneling and the like. In the building structure 14 of FIG. 1, it may be assumed that the interior wall surfaces in each of the rooms 16 and 18 are finished with such suitable building materials as are mentioned above, but that the back sides or external sides of the walls are unfinished so as to expose the two-by-four studs therein.

Figure 2:
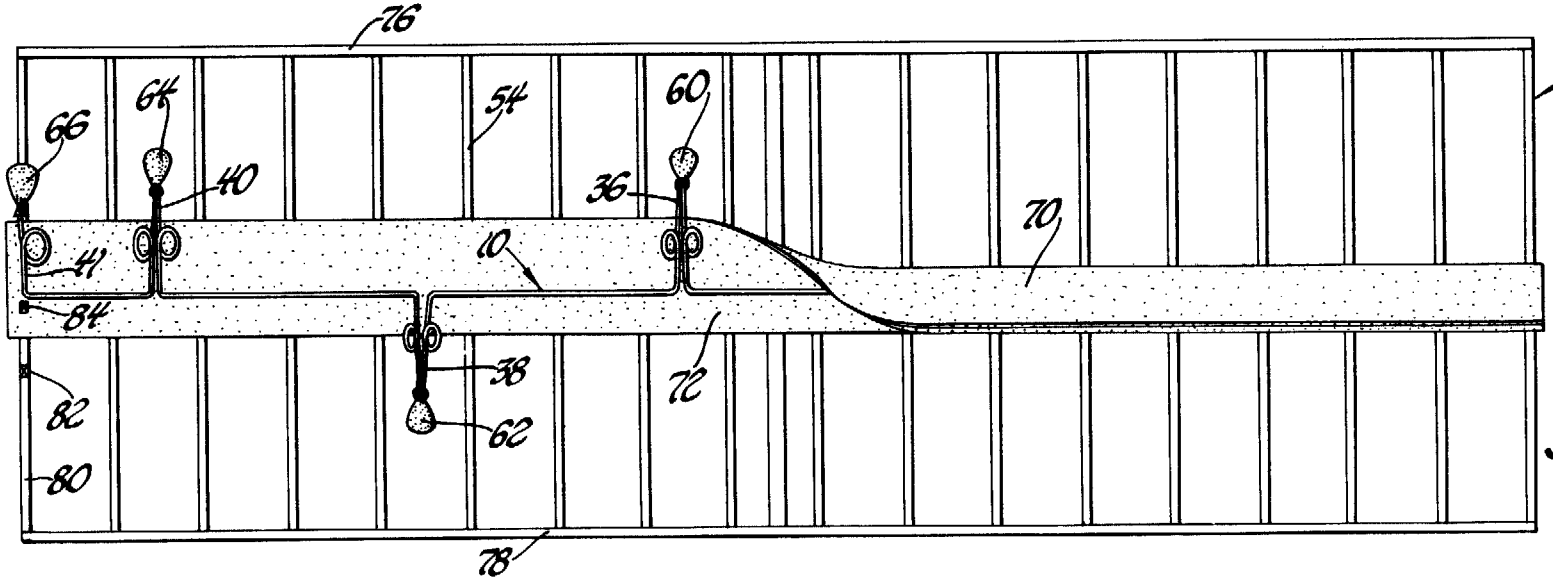
FIG. 2 is a plan view of a modular ceiling structure illustrating the application and installation of a specific embodiment of the invention thereto.

In FIG. 1 the wiring harness 10 is shown to be fully installed in the ceiling module 12, but only partially installed in the building structure 14. Wiring harness 10 comprises a main trunk cable 22 of the sheathed multiple-conductor type such as ROMEX and of such length as to extend substantially fully between the end walls 24 and 26 of the rooms 16 and 18, respectively. The harness 10 comprises in addition to the main trunk cable 22 a plurality of branch cables 28, 30, 32, 34, 36, 38, 40, and 41 which are electrically connected to the main trunk cable 22 at longitudinally-spaced locations. As shown in FIGS. 1 and 2, these spaced locations are determined in advance by reference to the plans for the building structure 14 and the advance determination of the specific locations of the electrical terminal devices, including switches and outlets which are to be disposed therein. In the specific example shown, branch cable 28 is electrically connected to trunk cable 22 at the end thereof which is adjacent the ceiling joist 42 when the wiring harness 10 is placed in position. The remaining branch cables are spaced along cable 22, some falling between and some falling along specific ceiling joists as shown. Where a branch cable location falls between two joists, it is preferable to allow enough cable to permit the branch to be tacked or stapled to a joist for purposes of securement.

Each of the branch cables 28, 30, 32, 34, 36, 38, 40, and 41 shown in the embodiment to FIG. 1 has an electrical terminal device connected to the opposite end thereof in such fashion as to be completely, electrically integrated with the wiring harness 10 requiring only the application of power thereto to become operational. In room 16 of FIG. 1, electrical device 44, such as a switch, is connected to branch cable 28 and is disposed in a small, polyethylene bag along with a substantial portion of the vertical run of branch cable 28 such that when the wiring harness 10 is disposed in the ceiling module 12, the electrical terminal device 44 hangs about 18 inches or so from the top of the ceiling, i.e., substantially above its normal fixed position. Electrical terminal device 46 in the form of a duplex outlet is connected to the end of branch cable 30 and is also wrapped in a small, transparent, polyethylene bag. Again, a coiled portion of the branch cable 30 is disposed in the bag along with the electrical terminal device 46 so that it hangs a short distance from the ceiling after application of the harness 10 to the ceiling module 12. In a similar fashion, electrical terminal devices 48 and 50 are electrically connected to the end of branch cables 32 and 34 and are bagged or packaged along with a portion of the vertical run of the branch cables.

In the lefthand room 18 as seen in FIG. 1, an electrical terminal device 60 in the form of a switch is connected to the end of branch cable 36 and electrical terminal devices 62, 64, and 66 in the form of standard duplex outlets are connected to the ends of branch cables 38, 40, and 41 respectively. In the room 18 all of the electrical terminal devices 60, 62, 64, and 66 are shown after removal from the polyethylene packaging bags previously securing same and extended vertically to their normal installation positions. It will be noted that switch 60 and duplex outlet 64 are disposed on the rearmost wall of room 18, as seen in FIG. 1, duplex outlet 62 is installed in the front wall of the room 18, as seen in FIG. 1, and duplex outlet 66 is installed in the lefthand wall of room 18, as shown in FIG. 1. It will be understood by those skilled in the art that the actual installation of the electrical terminal devices 60, 62, 64, and 66 involves a simple process of nailing the metal or plastic box which carries the actual electrical device into the side of a two-by-four stud with the front face of the box pointed into the room. Where interior wall materials are previously set in place and nailed to the studs, suitably shaped and located apertures are provided in the wall materials so that the terminal devices 60, 62, 64, and 66 may be simply pushed partially through these apertures and nailed in place. An interior cover plate is then applied to the various devices to finish the appearance thereof.

Figure 3:
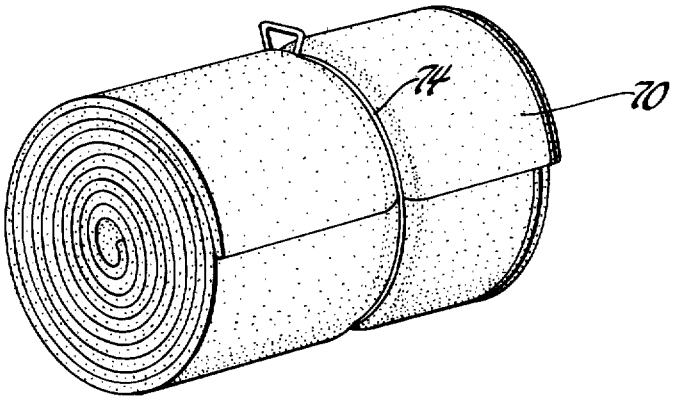
FIG. 3 is a perspective view of an electrical wiring unit packaged in accordance with the present invention; and, FIG. 4 is a side view of a portion of a building structure incorporating various details of the apparatus shown in FIG. 1.

FIG. 2 illustrates the ceiling module 12 in plan view prior to its installation on the wall units of the building 14 of FIG. 1 and with the wiring harness 10 partially unpackaged and in the initial phases of installation. In FIG. 2 the wiring harness 10 is shown partially removed from an elongated polyethylene envelope 70 which extends substantially from one end of the ceiling module 12 to the other and substantially along the centerline thereof. The polyethylene envelope 70 is provided with an adhesive coating along one longitudinal edge 72 thereof and is folded over to encompass the trunk cable 22 and the various branch cables after having aligned the branch cables and the electrical terminal devices secured thereto with the trunk cable 22. The envelope 70 is then rolled up and secured by means of a bailing wire or twine 74 to provide the rolled package illustrated in FIG. 3. This package is placed on the ceiling module 12 for installation thereto and is unrolled to the configuration of FIG. 2 to begin the installation process.

As shown in FIG. 2, the envelope 70 is opened longitudinally and the branch cables, such as 34, 36, 38, and 40, are laid out transversely, that is parallel to the direction of the ceiling joists such as 54, and on one side or the other of the trunk cable 22 in accordance with the inside or outside wall location of the electrical terminal device in the building plan. The branch cables 34, 36, 38, and 40 are then stretched out to their full extent with the electrical terminal devices associated therewith hanging over the outside of the ceiling module frames 76 and 78, respectively. The branch cables 34, 36, 38, and 40 as well as the other branch cables are then tacked or stapled along the tops or sides of the ceiling joists closest thereto for partial securement and left hanging over the sides, as previously described.

The initial location of the wiring harness 10 relative to the ceiling module 12 is facilitated by means of a mark, such as a paint dab, on the ceiling joist 80, as shown in FIG. 2 by the X mark 82 and by a similar mark on the trunk cable 22 as indicated in FIG. 2 by the X mark 84. The two X marks 82 and 84 are preplanned to be in at least longitudinal coincidence when the wiring harness 10 is properly longitudinally disposed relative to the ceiling module 12. This is readily accomplished by placing the rolled-up polyethylene envelope 70 containing the wiring harness 10 at the far right side of the ceiling module 12 and unrolling it down the center of the ceiling module by pulling on the outside end until the X mark 84 longitudinally lines up with the X mark 82. At this point the envelope 70 is opened, the branch cables laid out sid[illegible]-side as previously described, and the envelope 70 may be thereafter disposed of.

SUMMARY OF THE FABRICATION PROCEDURE

1. The trunk cable 22 is laid out to a length which corresponds to the longitudinal dimension of a ceiling module 12.
2. Branch cables are cut to a dimension so as to accommodate the horizontal run across the ceiling module and the vertical run down the wall to which the ceiling module is to be attached to the standard height of the particular circuit device which is to be connected to that branch cable. Reference should be made to the building specification or blueprint to identify the length of the branch cable in accordance with ceiling height and ceiling depth and also in accordance with the particular type of electrical terminal device to be connected to that branch cable.
3. The branch cables are electrically connected at spaced points along the trunk cable 22, these spaced points being determined by reference to the building specification or blueprint which indicates the peripheral disposition of the electrical terminal device around the particular wall on which it is to be mounted. Mark 84 is applied.
4. The individual electrical terminal devices are permanently wired and the harness is tested.
5. The individual electrical terminal devices and a portion of the vertical run of the branch cable associated therewith are coiled and wrapped in nonpermeable bags, such as the polyethylene bags illustrated in FIGS. 1 and 2.
6. The trunk cable 22 along with the branch cables and the wrapped electrical terminal devices are laid out on the longitudinally extended envelope 70 so as to form substantially a straight line, the envelope 70 is closed over the harness 10 and wrapped into the rolled configuration shown in FIG. 3.

SUMMARY OF THE INSTALLATION PROCEDURE

1. The rolled envelope 70 with the wiring harness 10 therein is placed on the ceiling module 12 and unrolled from one end to the other until the locator marks 82 and 84 line up.
2. The envelope 70 is opened and the electrical terminal devices are laid out to one side or the other in accordance with the wall on which they are thereafter to be located. The terminal devices are laid over the outside wall borders so as to hang down the other peripheral sides thereof.
3. The branch cables are secured, such as by stapling along the closest ceiling joists and partially down the outside border portions of the ceiling module 12.
4. The ceiling module 12 with harness 10 thereon is taken to the building site and placed on the building structure 14 in the proper orientation.
5. After securing the ceiling module 12 to the building structure 14 with the bagged or packaged electrical terminal devices hanging around the outside walls thereof, the individually packaged units are opened and allowed to extend vertically down the outside of the wall in which they are to be mounted.
6. The electrical terminal devices are placed into the interior wall apertures and nailed in place. It remains only then to connect the trunk cable 22 to the source of electrical power for the building structure 14 to actuate all of the prewired devices.

Figure 4:
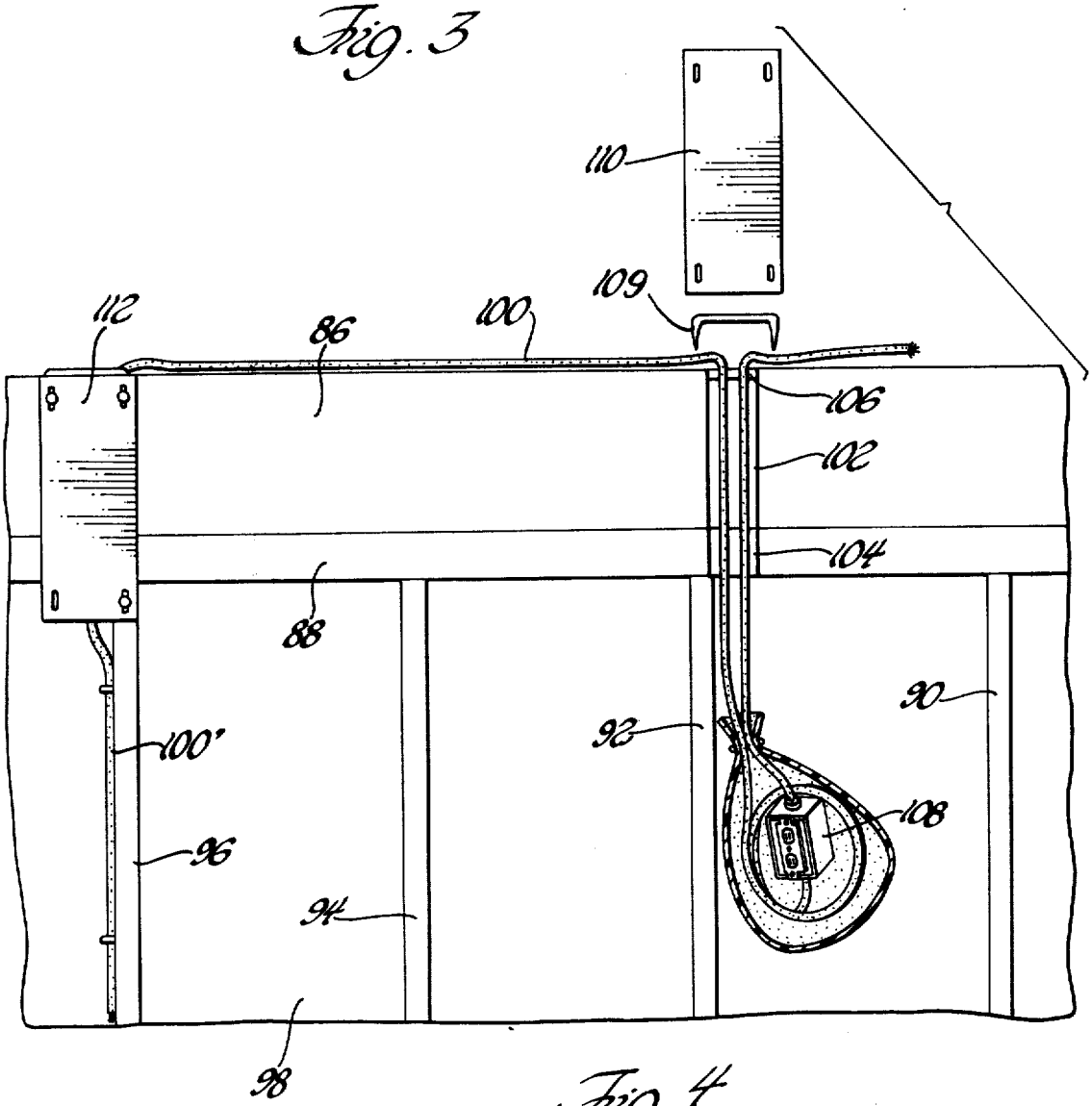

Reference to FIG. 4 shows several details of a typical installation including the means by which the branch cables are extended along the outside periphery of the ceiling module and along the studs of the wall units on which they are to be mounted. In FIG. 4 a ceiling beam 86 which may either be a joist or border element of the ceiling module 12 is disposed over and on a wall plate 88 having a plurality of conventionally spaced two-by-four studs 90, 92, 94, and 96 secured thereto. FIG. 4 shows an interior wall material sheet 98 secured to the inside surface of the two-by-four studs leaving the rear surface of the wall open; i.e., the studs 90, 92, 94, and 96 are open to the observer viewing from the vantage point of FIG. 4. A cable 100 is shown extending longitudinally along the joist 86 from a position immediately above stud 96 to a position immediately above stud 92 and, thence, on to the right side of the building structure shown in FIG. 4. Accordingly, it is to be understood that the cable 100 is representative of a technique of continuous stringing between two or more electrical terminal devices which may be employed in accordance with the invention. In FIG. 4 the cable 100 is presumably connected to another cable at the right-hand side of the arrangement or, alternatively, it may be presumed that the cable 100 actually represents the trunk cable with the branch cables merely being continuous, but vertical extensions thereof.

In FIG. 4 a vertically-extending notch 102 is formed in the joist 86 and continuously therewith a vertical notch 104 is formed in the plate 88 to define a continuous groove or channel from the top of the joist 86 to the bottom of the plate 88. In addition, a shallow groove 106 is formed in the top of the joist 88 contiguous with the notch 102 in the face thereof. The electrical cable 100 is brought over the top of the joist 86 and, thence, downwardly along the channel formed by the notches 102 and 104 to the coiled and wrapped electrical terminal device 108, as shown. The cable 100 is thence brought back up through the continuous channel and on across the top of the joist 86. A barbed metal protector plate 109 is nailed across the notch 106 in the top of the joist 86 and a large metal protector plate 110 is nailed in place across the continuous channel in the face of the joist 86 and the side of the plate 88 to protect the cable 100 in that groove against inadvertent destruction, such as by driving a nail into the cable. A plate 112 is shown in place to the left of the channel formed by notches 102 and 104, that is immediately above the two-by-four stud 96 in FIG. 4, to protect the vertical extension 100' of branch cable 100.

It is to be understood that the electrical harness of the present invention may be applied to modular as well as conventionally-built ceilings and also to modular as well as conventionally-built wall units. In the case of a wall unit the electrical trunk cable may be dimensioned and wrapped in accordance with the building plan and in the location of the electrical terminal devices as hereinbefore described and rolled into a polyethylene envelope in accordance with the illustration of FIG. 3. A guideway or route for the trunk cable may be established around the inside or outside of a room or group of rooms under construction by quickly and easily milling a series of notches in the faces of the studs at a uniform height off the floor all around the room. This may be expeditiously accomplished by means of a router mounted on a dolly. The trunk cable is then strung peripherally around the room with branch cables or branch extensions of the trunk cable extending off vertically to the electrical terminal devices which are previously wired and secured thereto, the rolled envelope being unrolled during the process. This installation procedure is preferably carried out by a team of men who when working together can install all of the prewired and preassembled electrical terminal devices for an entire residential structure in a matter of hours. It will also be understood that various other electrical terminal devices in addition to switches and duplex outlets may be employed in accordance with the invention; however, regardless of the type of device it is to be understood that the devices are nearly always fully preassembled and prewired and secured to the electrical branch cables or the trunk cable extensions which form the branch cables. Accordingly, it will be understood that various alternative applications and embodiments of the invention will occur to those skilled in the art and that the foregoing specification is not to be construed as limiting the invention.

The embodiments of the invention in which an exclusive property or privilege is claimed are defined as follows:

1. Electrical wiring apparatus for use in [ establishing electrical connections between each of a plurality of electrical terminal devices to be disposed in predetermined locations in] *wiring* a building structure comprising: a wiring harness including a main trunk cable of a developed length substantially equal to said structure to be wired and a plurality of branch cables having one end electrically [ connected to ] *joining with* said trunk cable at spaced locations along the length thereof; [ said spaced locations to be determined in accordance with the longitudinal spacings between terminal device locations within said structure; ] each of said branch cables having an individual electrical terminal device electrically connected to the other end thereof; [ the length of said branch cables being equal to the sum of the horizontal distance from said trunk cable to one side of said structure and the vertical distance between the trunk cable and the standard vertical location of the particular terminal device; ] first package means disposed about individual terminal devices and at least a portion of the branch cables connected thereto; and second package means disposed about the entire harness including said trunk and branch cables and electrical terminal devices. [ and being of such length and width as to permit said harness to be rolled up therein from one end to the other. ]

2. Apparatus as defined in claim 1 *wherein said second package means comprises an elongate envelope disposed about said harness and rolled up with said harness therein from one end to the other, said apparatus further* including locater marks on said harness adjacent said other end of said *second* [outer] package *means* to locate said harness relative to said structure while unrolling said second package means.

3. Apparatus as defined in claim 1 wherein said first package means includes individual wrappings of nonpermeable material disposed about said electrical terminal devices and portions of said electrical branch cables.

4. Apparatus as defined in claim 1 wherein said second package means includes an elongate envelope of nonpermeable material secured about said harness and rolled up with said harness therein from one end to the other.

5. Apparatus as defined in claim 1 wherein said electrical terminal devices include electrical outlets and switches.

6. A prewired electrical wiring unit for installation in a building structure of predetermined dimensions comprising: a wiring harness including a multiple conductor trunk cable, and a plurality of electrical terminal devices electrically connected to said trunk cable at locations spaced therealong [ and defined by branch cable portions according to the peripheral spacings between terminal device locations in said building structure, ] *by branch cables* and packaging means for said harness and comprising an envelope of nonpermeable sheet material disposed lengthwise around the trunk cable *and branch cables and terminal devices* and being rolled up with said trunk cable *and branch cables and terminal devices* therein from one end to the other.

7. Apparatus for providing electrical wiring in a building structure including: a preformed normally horizontally installed structural [ unit ] *module* comprising border members and cross members, a wiring harness including a main trunk cable extending longitudinally across said structural module and perpendicular to said cross members, a plurality of branch cables electrically connected at one end to said [ wiring harness ] *main trunk cable* and extending outwardly therefrom across said structural module and around said border members on the outside thereof at spaced locations, said spaced locations being determined in accordance with the longitudinal spacing between terminal device locations within a building structure to receive said structural module, each of said branch cables having an individual electrical terminal device electrically connected to the other end thereof.

8. Apparatus as defined in claim 7 including package means of nonpermeable sheet material disposed about each of said electrical terminal devices and at least a portion of the electrical branch cable associated therewith.

9. Apparatus as defined in claim 7 including vertically oriented channels formed in the outer peripheral surfaces of said structural module [ members to accommodate ] *member accommodating* said branch cables therein.

10. Apparatus as defined in claim 9 including metal protective plates secured over said channels to protect said branch cables.

11. A method of [ installing ] *constructing and packaging* electrical wiring comprising the steps of: preparing an electrical wiring harness comprising a main trunk cable and a plurality of branch cable portions *electrically integral with the main trunk cable and* having individual electrical terminal devices secured to said branch [ terminal ] *cable* portions, packaging each of said electrical terminal devices individually along with a portion of the branch cable secured thereto, and subsequently packing the entire wiring harness in an elongate envelope of nonpermeable sheet material and rolling the envelope and the wiring harness up from one end to the other.

12. A method [ as defined in claim 11 ] *of installing electrical wiring* including the [ further ] steps of: *preparing an electrical wiring harness comprising a main trunk cable and a plurality of branch cable portions electrically integral therewith and having individual electrical terminal devices secured thereto, packaging each of said terminal devices individually along with a portion of the branch cable secured thereto, further packaging the entire harness in an outer package, subsequently placing the outer package and harness on a building module, extending the trunk cable along the module,* [ placing the rolled envelope and wiring harness on a building module, unrolling the roll, opening the envelope ] and extending the branch cable portions outwardly from the trunk cable and securing the branch cable [ portion ] *portions* to the building [ structure ] *module* at predetermined locations.

13. A method as defined in claim 12 including the steps of placing locator markings on the harness and the module, and placing the harness in accordance with said markings.

* * * * *